May 15, 1962  J. R. BOUCHARD ETAL  3,035,238
SUPPORT MEANS
Filed Oct. 22, 1958

*INVENTORS*
JOHN R. BOUCHARD
DAVID de R. NORTON
BY Roger W. Jensen
ATTORNEY

United States Patent Office 3,035,238
Patented May 15, 1962

3,035,238
SUPPORT MEANS
John R. Bouchard, Norwood, and David de R. Norton, Westwood, Mass., assignors to Minneapolis-Honeywell Regulator Company, Minneapolis, Minn., a corporation of Delaware
Filed Oct. 22, 1958, Ser. No. 768,945
3 Claims. (Cl. 336—30)

This invention is concerned with providing a support means for the one member of a two-part electro-magnetic transducer. Such a transducer in one form comprises a stator member of general annular shape having a plurality of pole portions extending generally inwardly in a radial direction from a circular yoke portion, the pole portions terminating in pole faces which collectively define a generally circular bore or aperture. Primary windings are provided on the pole portions and are adapted to be energized by alternating current so as to produce an alternating flux in the stator member and secondary windings are also provided on the pole portions for signal generating purposes, voltages being induced therein as a function of relative movement from a null position between the stator member above described and a rotor or armature member positioned by suitable means within the bore or aperture defined in the stator. In some embodiments the armature is supported for reciprocating type motion relative to the stator while in other embodiments the rotor or armature would be mounted for rotation relative to the stator.

Heretofore, with electromagnetic transducers of the above type, there has been a problem with errors caused by undesired asymmetrical transverse or radial relative movement or shifting between the armature or rotor and the stator unit. This problem is especially pronounced when the device is subjected to wide variations in temperature due to forces created by different rates of expansion and contraction between the stator member and its housing. Heretofore, the stator units have been rigidly mounted in a main base or housing by various means such as by being cemented or potted in place or by being cemented to a solid plate which in turn is secured to the housing. The armature or rotor element is usually supported by resilient means such as leaf springs or spring diaphragms or by bearing means to define a displacement axis relative to the stator unit.

With the previous arrangements when the stator unit shifted asymmetrically in the transverse or radial direction relative to the rotor unit, the result has been the development of false signals by the transducer. It will be understood that this is undesirable since it introduces errors into the system in which the transducer is being used.

The previous arrangements also suffered from the defect of producing false or error signals caused by strains or stresses being set up in the stator element of the pickoff which changed the magnetic characteristics of the stator. The stresses are a result of a variation in expansion and contraction of the stator and housing.

The present invention solves the above described problems by providing a unique means of mounting or supporting the stator unit relative to the main base in such a way that the stator can expand or contract relative to the base in a uniform or a symmetrical being somewhat resiliently held for this movement. The mounting means however is rigid in all other respects. For example, the stator is rigid with respect to the normal range of accelerations likely to be encountered by the device both in the radial and axial directions.

An object of this invention therefore is to provide a mounting means for one member of a two-part electromagnetic transducer such as a signal generator of the inductive pickoff type which will prevent the said one member from being shifted asymmetrically in the transverse or radial sense relative to the other member associated therewith and which will prevent the creation of stresses in said one member in response to such factors as forces developed by a wide variation in temperature.

Other objects will become more apparent from a reading of the specification and appended claims, together with the drawings in which:

Figure 1:
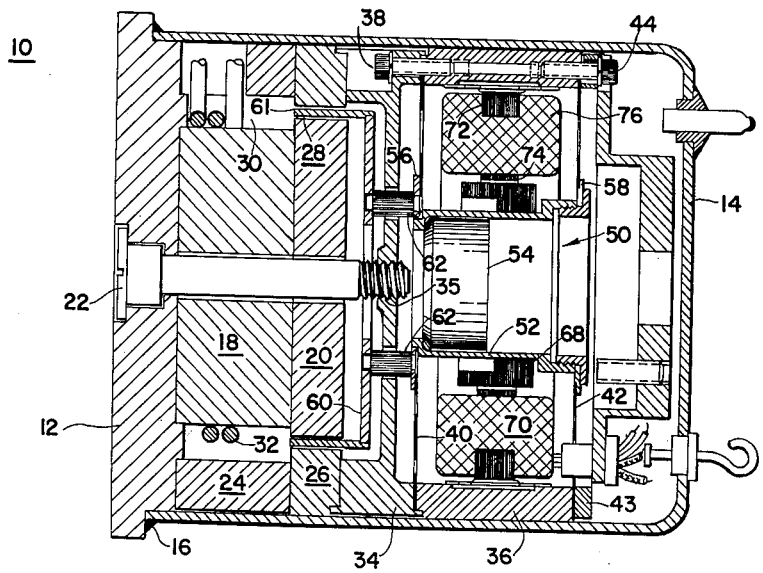
FIGURE 1 is a cross-sectional view of a linear accelerometer comprising in part an electromagnetic pickoff which in turn includes a stator unit supported in accordance to the teaching of the present invention.

In FIGURE 1 reference numeral 10 identifies a linear accelerometer comprising in part a base member 12 and a cup-like member 14 which are adapted to be fitted together and hermetically sealed by suitable means such as soldering as at 16 to form an enclosure. Base member 12 forms a portion of an electromagnetic eddy current damper and is made out of a suitable magnetic material such as soft iron. Centrally positioned on the inner face of base member 12 is a plug or cylindrically shaped permanent magnet member 18. A soft iron pole piece 20 of cylindrical shape is provided adjacent to the inner face of permanent magnet 18. Base member 12, magnet member 18, and pole piece member 20 are all securely bonded together by suitable means such as an adhesive commercially known as "Stycast." An annular or ring permanent magnet member 24 is also mounted on the inner face of base member 12 concentric with permanent magnet 18 and on its inner face is provided with a soft iron pole piece 26 of annular shape. Members 12, 24, and 26 are bonded together by suitable means such as "Stycast." Pole pieces 20 and 26 collectively define an annular air gap 28.

An annular opening 30 is defined between the inner surface of magnet 24 and the outer surface of magnet 18 and in this zone is placed a winding 32 of suitable wire adapted, after the magnetic structure above described has been assembled, to be energized by a suitable direct current so as to magnetize the permanent magnets 18 and 24 sufficient to develop a flux density in the air gap 28 of the desired amount.

An intermediate base member 34 having a general flat circular configuration is provided to shield the pickoff and seismic mass from the leakage flux produced by the permanent magnet damper. Thus, member 34 is made out of a suitable permeable material such as soft iron. Member 34 is positioned with one axial face abutted against the inner face of pole piece 26 and is held in this position by suitable means such as a machine screw 22 which has an enlarged head portion and one end adapted to fit into a suitable central recess in base member 12 and a shank portion adapted to extend through suitable central apertures in base 12, magnet 18 and pole piece 20. The other end of screw 22 is suitably threaded and cooperates with a tapped central aperture 35 in member 34 to hold member 34 in assembled relationship with the damper assembly.

A stator housing member 36 of annular shape is provided inside of cover member 14 adjacent to the intermediate base member 34 and is secured thereto by suitable means such as screw means 38. Clamped between intermediate base member 34 and stator housing 36 is a thin diaphragm member 40 which is one of two resilient diaphragms which support the seismic mass. The other resilient diaphragm 42 is clamped to the other end of the stator housing 36 by suitable means including a ring 43 and screw means 44. The seismic mass assembly is generally identified by reference numeral 50 and includes a hollow tube-like member 52 in which is securely positioned a cylindrically shaped slug member 54 of suitable mass.

As shown in FIGURE 1, the left end of tube 52 is securely attached to a washer-like plate 56 which in turn is bonded by suitable means to the inner periphery of the resilient diaphragm 40. The right end of the tube 52 as shown in FIGURE 1 is provided with suitable means including a washer 58 clamped thereto for securing it to the inner periphery of the resilient diaphragm 42. It will be understood that the diaphragms 40 and 42 provide a means which permits the seismic mass assembly 50 to reciprocate relative to the remaining structure or to move to the left end and to the right as shown in FIGURE 1.

A conductive cup member 60 having a rim portion 61 fitted into the annular air gap 28 is also fastened to the seismic mass assembly 50 and forms a part thereof by virtue of a plurality of pins 62 which project through suitable apertures in the intermediate base member 34. Pins 62 are fixed at their one end to washer 56 and at their other end to cup member 60. It will be understood that the conductive cup 60 cooperates with the flux in the air gap 28 to dampen any reciprocations of the seismic mass assembly by virtue of eddy currents induced in the rim 61 of the cup by relative movement between the rim of the cup and the pole pieces 20 and 26 of the magnetic structure above described.

Means are provided for sensing relative displacement between the seismic mass assembly 50 and the remaining structure of the accelerometer. The signal generating means includes an armature member 68 of magnetic material which is fixed to the outer periphery of the tube 52 and thus becomes a part of the seismic mass. The signal generating means further includes a stator member 70 having an outer circular yoke portion 72 of magnetic material from which depend a plurality of inwardly extending pole portions 74 which terminate in pole faces 75 which collectively define a circular aperture or opening 75' (see FIGURE 4) in which is disposed the armature member 68. Winding means 76 are provided on stator member 70 including energizing windings and pickoff or secondary windings, the details of which do not have to be shown for an understanding of the present invention. However, for further details of the general theory of operation of the pick-off means including the stator member 70 and the armature member 68, reference may be made to the co-pending application of Alan M. Campbell and Leonard P. Entin, filed November 5, 1958, Serial No. 771,994, and assigned to the same assignee as the present invention.

Figure 2:
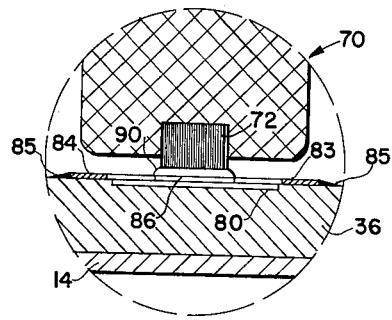
FIGURE 2 is a detailed view of a portion of the structure shown in FIGURE 1.
Figure 4:
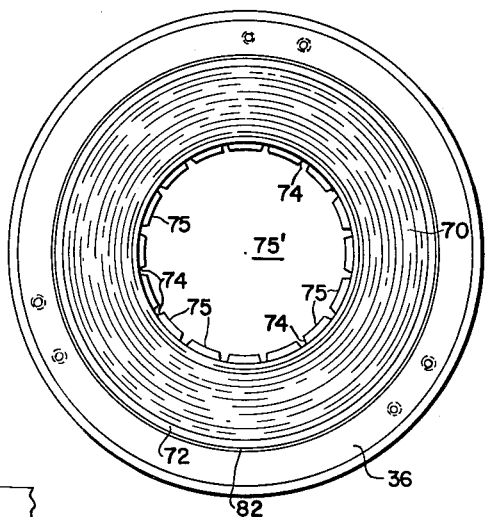
FIGURE 4 is an end view of the stator unit mounted in its housing.
Figure 3:
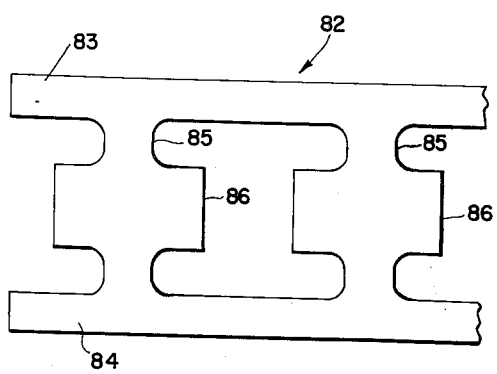
FIGURE 3 is an enlarged view of a portion of the band or strip which connects the stator to the base.

Means are provided for mounting the stator member 70 relative to the stator housing 36, this means being shown in greater detail in FIGURES 2 and 3. In FIGURE 2 it will be noted that the annularly shaped stator housing 36 is provided with an inner circumferential recess 80 which extends around the entire inner periphery thereof. A band member 82 is provided for connecting the stator member 70 to the housing 36. A section of band member 82 is shown in detail in FIGURE 3 and it will be noted that it comprises a strip of material having two continuous outer longitudinal edges or portions 83 and 84 being joined together at intervals by a plurality of transverse members or ribs 85. The center portion of each rib 85 is enlarged in area as at 86. The band 82 is made out of a suitable material that will have a slight amount of elasticity or resiliency such as cold rolled steel. For example, material that has been found satisfactory is C.R.S. 1020 shim stock 0.010 inch in thickness. The band member 82 is formed in the shape of substantially a closed loop as shown in FIGURE 4 and is then positioned in the bore of the cylindrical housing 36 so that the transverse members or ribs 85 straddle the recess 80. In this position the edges 83 and 84 of the band 82 are in engagement with the inner surface of the housing 36 and are on opposite sides of the recess 80. The band 82 is fixed in this position relative to the housing 36 by suitable means such as soft solder 85 shown in FIGURE 2.

The stator member 70 is then positioned within the bore of housing 36 so that it is symmetrically located with respect to recess 80 and band 82. The stator 70 has an outer diameter slightly smaller than the inner diameter of the loop formed by band 82. In other words, there is a designed clearance between the band and housing assembly and the stator assembly. In the assembly process the stator assembly is held concentric relative to the housing 36 by suitable fixture means, not shown, and then the stator assembly is bonded to the relief band 82 by suitable adhesive means 90 such as "Stycast."

The mounting means above described for stator member 70 on annular housing 36 has a slight amount of resilience in the radial or transverse direction in response to the stator 70 tending to move radially or transversely with respect to the housing 36. For example, when the device 10 is subjected to wide variations in temperature there will be a tendency for the members 70 and 36 to move radially with respect to one another due to differences in temperature expansion coefficients. Ideally the coefficients are kept as close together as possible but from a practical standpoint it is impossible to match them exactly. With the present arrangement the stator 70 and housing 36 can have relative radial movement therebetween that is controlled very symmetrically or uniformly in such a way that the members will always remain concentric. This is in contrast to prior arrangements wherein a stator assembly similar to member 70 would be rigidly mounted in a housing. With that arrangement it was found that the inner periphery of the stator unit 70 would become eccentric with respect to the armature assembly and would experience strains so as to produce false signals. With the present arrangement the stator unit 70 remains free of stresses and strains and also remains concentric with respect to the armature assembly including armature 68 over a considerable variation in ambient temperature so that the source of error has been removed. The mounting means however is quite rigid with respect to the usual acceleration forces experienced by a device of this type both in the sensitive axis direction as well as in the cross axis directions. Thus the stator unit 70 is rigidly mounted with respect to mounting 36 with respect to such accelerations but yet the ribs 85 have sufficient elasticity so as to permit relative radial movement between stator 70 and housing 36 in response to the relatively large forces created by unequal expansion or contraction.

In some embodiments of the invention it may be desired to omit the enlarged areas 86 in the transverse ribs 85. As shown the enlarged areas 86 have been provided so as to increase the area of contact or bonding surface between the band 82 and the yoke portion 72 of the stator 70.

While we have shown and described one embodiment of this invention it will be appreciated by those skilled in the art that the invention may take a variety of shapes and forms. Accordingly, we desire it to be understood that this invention is not to be limited to the particular form shown and we intend in the appended claims to cover all modifications which do not depart from the spirit and scope of this invention.

What we claim is:

1. In an electromagnetic position sensor: a housing member having a bore therethrough and a shallow circumferential recess therein adjacent to said bore; a stator member having a cylindrical outer periphery and having an aperture therethrough; and means for concentrically supporting said stator element within said bore of said housing comprising a cylindrically shaped band member of slightly resilient material, said band member having two continuous outside edges and a plurality of ribs joining said edges; means bonding said ribs to said outer periphery of said stator member; means bonding said edges to said housing within said bore so that said ribs straddle said recess, said supporting means thereby permitting uniform radial movement of said stator element relative to said housing element in response to temperature variations; an armature member; and means concentrically mounting said armature member within said aperture of said stator member permitting rotational movement therebetween.

2. In an electromagnetic position sensor: a housing member having a bore therethrough and a circumferential recess in said bore; a stator member having a cylindrical outer periphery and an aperture therethrough; and means for supporting said stator element within said bore of said housing including a cylindrically shaped band member of slightly resilient material positioned therebetween, said band member having two continuous outside edges and a plurality of ribs joining said edges; means bonding said ribs to said outer periphery of said stator member; means bonding said edges to said housing within said bore so that said ribs straddle said recess; an armature member; and means for concentrically mounting said armature member within said aperture of said stator member permitting axial movement of said armature member relative to said stator member.

3. In a transducer of this class wherein movement of one member relative to another member is sensed by an electromagnetic position sensor including a housing having a bore therethrough and a circumferential recess in said bore, a stator member having a cylindrical outer periphery and an aperture therethrough and being mounted within said bore, and an armature member mounted concentrically within said aperture of said stator wherein relative axial or rotational movement of said armature relative to said stator produces an output signal and wherein variation in temperature causes asymmetrical radial movement between said stator and said housing and between said stator and said armature causing spurious signals to be produced, in combination with means for supporting said stator element within said bore of said housing comprising a cylindrically shaped band member of slightly resilient material, said band member having two continuous outside edges and a plurality of ribs joining said edges; means bonding said ribs to said outer periphery of said stator member; and means bonding said edges to said housing within said bore so that said ribs straddle said recess; said supporting means thereby permitting uniform radial movement between said housing and said stator member and between said stator and said armature member in response to temperature variations.

References Cited in the file of this patent
UNITED STATES PATENTS

| | | |
|---|---|---|
| 2,811,659 | Barlow | Oct. 29, 1957 |
| 2,870,422 | Gindes | Jan. 20, 1959 |

FOREIGN PATENTS

| | | |
|---|---|---|
| 657,790 | Germany | Mar. 12, 1938 |
| 830,207 | Germany | Feb. 4, 1952 |